United States Patent [19]
Jamain et al.

[11] Patent Number: 5,982,065
[45] Date of Patent: Nov. 9, 1999

[54] MAGNETIC BEARING WITH ATTACHED COIL CORE

[75] Inventors: Patrice Jamain, Maule; Charles Lambert, Poissy, both of France

[73] Assignee: Aerospatiale Societe Nationale Industrielle, France

[21] Appl. No.: 08/560,823

[22] Filed: Nov. 20, 1995

[30] Foreign Application Priority Data

Nov. 21, 1994 [FR] France .................................. 94 13896

[51] Int. Cl.⁶ .................................................. F16C 39/06
[52] U.S. Cl. ............................. 310/90.5; 310/90; 310/91
[58] Field of Search ............................... 310/90, 90.5, 91, 310/216, 259; 104/281, 283; 324/208; 335/297, 299, 281

[56] References Cited

U.S. PATENT DOCUMENTS

| | | | |
|---|---|---|---|
| 2,752,517 | 6/1956 | Von Delden | 310/89 |
| 3,989,967 | 11/1976 | Kikuyama et al. | 310/112 |
| 4,048,548 | 9/1977 | Nakajima et al. | 318/138 |
| 4,386,287 | 5/1983 | Karasawa et al. | 310/49 R |
| 4,470,644 | 9/1984 | Weisser | 308/10 |
| 4,739,294 | 4/1988 | Van Mensvoort et al. | 335/297 |
| 4,857,875 | 8/1989 | Matsuo et al. | 335/297 |
| 4,908,808 | 3/1990 | Knapen et al. | 368/157 |
| 4,918,345 | 4/1990 | De Guelis et al. | 310/90.5 |

FOREIGN PATENT DOCUMENTS

| | | |
|---|---|---|
| A-0 191 225 | 8/1986 | European Pat. Off. . |
| A-0 284 487 | 9/1988 | European Pat. Off. . |
| A-2 358 527 | 5/1975 | Germany . |

*Primary Examiner*—Nestor Ramirez
*Assistant Examiner*—Tran N Nguyen
*Attorney, Agent, or Firm*—Vanophem Meehan & Vanopem, P.C.

[57] ABSTRACT

A magnetic bearing for active magnetic centering, on at least one centering axis perpendicular to a reference axis, a first body mobile at least on this centering axis relative to a second body includes at least one magnetized member and at least one coil wound around a ferromagnetic core substantially parallel to the reference axis and carried by the second body. Two parallel ferromagnetic plates perpendicular to the reference axis are attached to the core on respective opposite sides of the coil and have transversely oriented edges opposite the airgaps. The core is attached to the edges of the parallel plates.

9 Claims, 3 Drawing Sheets

MAGNETIC BEARING WITH ATTACHED COIL CORE

BACKGROUND OF THE INVENTION

1. Field of the Invention

The invention concerns a magnetic bearing for active magnetic centering and, particularly, a magnetic bearing of modular construction having a removably attached ferromagnetic core and coil.

2. Description of the Prior Art

Examples of magnetic bearings are described in European Patent 0 284 487 and U.S. Pat. No. 4,470,644.

The aforementioned bearings essentially differ from one another in that, in U.S. Pat. No. 4,470,644, the permanently magnetized members are carried by a body separate from that on which the coils are mounted whereas in European Patent 0 284 487 the permanently magnetized members are mounted on the same body as the coils.

In practice the coils of the magnetic bearings of the aforementioned type are fitted onto cores disposed between two ferromagnetic plates, the flux lines passing longitudinally through the cores, entering and leaving the cores at their edges. Accordingly, access to these cores is possible only during manufacture (access is impossible once assembly of the bearing is completed and necessarily so once the bearing is mounted in a system ready to operate). Moreover, good control of the field requires excellent control of the height of the cores so that their edges are exactly where required, against the ferromagnetic plates (or against one of these plates and against a static shim forming an airgap, as recommended in the aforementioned European Patent 0 284 487). This control can be difficult if more than one core has to be positioned between the same two plates.

SUMMARY OF THE INVENTION

An object of the present invention is to overcome the aforementioned drawbacks of prior art magnetic bearings by enabling individual mounting of each core of a bearing (independently of whether the other cores have already been fitted or not).

Another object of the present invention is to simplify storage requirements prior to fabrication so that, in particular, the ferromagnetic plates can be sized and fabricated without any knowledge of the geometrical characteristics of the coil-core assemblies into which they will eventually be integrated, and this by virtue of a modular design of the bearings. The converse is also advantageously made possible (core/coil assembly fabricated without any knowledge of the future geometry of the bearing, in particular its diameter).

A further object of the present invention is to enable demounting of the core/coil assemblies from the remainder of the bearing, even if the latter is mounted in the structure receiving it, thus enabling easy replacement or inspection of the coils and even the adaptation of the same bearing to various types of application merely by replacing one core by another similar core inserted in a different coil (for example, a coil with a different number of turns).

The present invention is in the form of a magnetic bearing for active magnetic centering on at least one centering axis perpendicular to a reference axis of a first body mobile on at least the centering axis relative to a second body, including:

at least one permanently magnetized member substantially parallel to the reference axis;

at least one coil wound around a ferromagnetic core substantially parallel to the reference axis and carried by the second body; and a ferromagnetic armature formed of a ferromagnetic first part carried by the first body and a ferromagnetic second part carried by the second body, the ferromagnetic first and second parts being conjointly adapted to close upon themselves the fluxes generated by the magnet and the coil via airgaps between the ferromagnetic first and second parts, the ferromagnetic second part including two parallel plates perpendicular to the reference axis each attached to the core on a respective side of the coil and having transversely oriented edges facing the airgaps, wherein the ferromagnetic core is attached to the edges of the parallel plates.

In accordance with preferred features of the invention, which may or may not be combined with one another:

the core is removably attached to the ends of the parallel plates by demountable fixing means;

as in European Patent 0 284 487, the permanently magnetized member is carried by the second body between the parallel plates, the core being preferably separated from at least one of the sides of the parallel plates by an airgap of constant thickness, wherein the airgap of constant thickness is a layer of air or vacuum;

the core of the present invention is attached to the ends of the parallel plates by screwthreaded rods, washers being fitted around these rods between the core and the ends of the parallel plates, the thickness of the airgap being defined by the thickness of the washers;

like in the aforesaid U.S. Pat. No. 4,470,644, the permanently magnetized member is carried by the first body; however, the core is attached to the ends of the parallel plates by screwthreaded rods;

the reference axis is an axis about which the first body turns relative to the second body, the bearing may include a plurality of permanently magnetized members, cores and armatures interconnected with each other; and the cores are in the form of flat plates.

Objects, features and advantages of the invention emerge from the following description given by way of non-limiting example with reference to the appended drawings.

DETAILED DESCRIPTION OF THE PREFERRED EMBODIMENT

Figure 1:
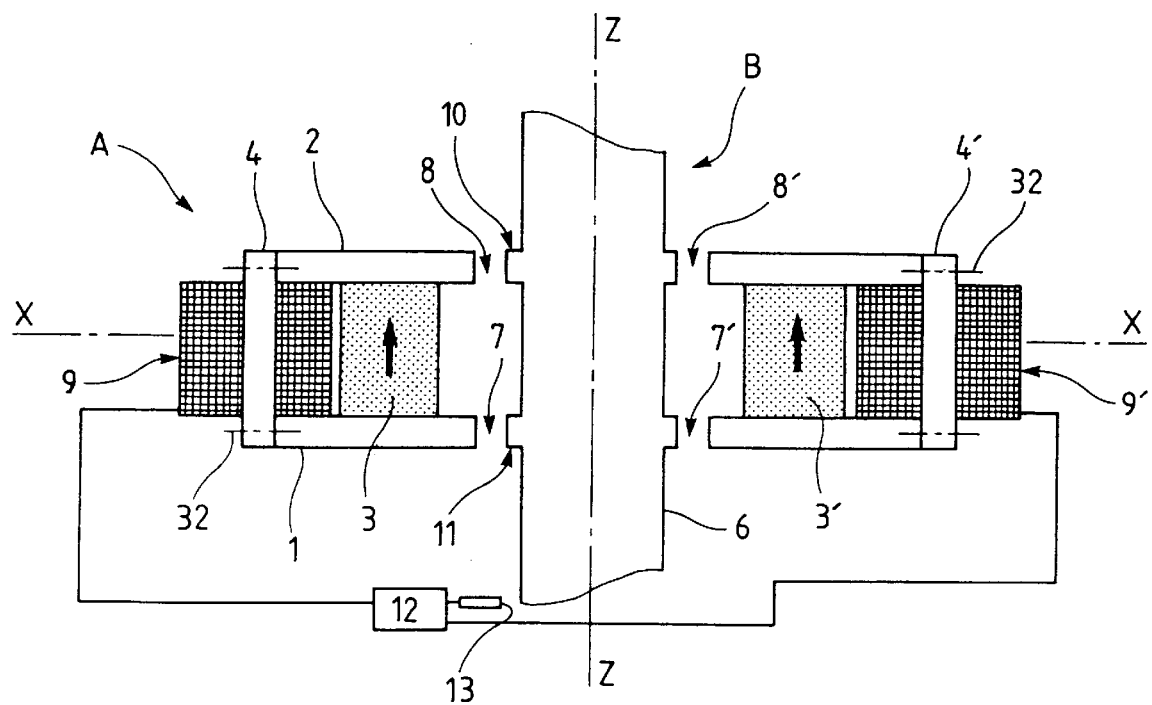
FIG. 1 is a diagrammatic view, in cross section in a plane containing a reference axis Z-Z, of a simplified version of an embodiment of a magnetic bearing in accordance with the present invention having only one active magnetic centering axis (but two coils)

FIG. 1 shows diagrammatically the basic version of a bearing in accordance with the present invention adapted to center a mobile body B relative to another body A along a centering axis X-X perpendicular to a reference axis Z-Z.

In the remainder of the description, and purely for convenience, it is assumed that the body A constitutes a rigid fixed stator incorporating fixed sensing and driving members and the electrical circuits required for the bearing to operate correctly.

The part B has, at least opposite the part A, a ferromagnetic material polepiece 6 of any type known in itself.

The basic bearing in FIG. 1 embodies two parts substantially symmetrical about a plane perpendicular to the axis X-X and containing the reference axis. The same reference numbers are used for these two parts, but "primed" in the case of the parts in the right-hand part of FIG. 1 to distinguish them from the parts in the left-hand part.

The left-hand part of the FIG. 1 bearing includes two ferromagnetic plates 1 and 2 (made from any ferromagnetic material known in itself) parallel to the axis X-X with a permanent magnet 3 between them magnetized parallel to the reference axis Z-Z. A ferromagnetic core 4 parallel to the axis Z-Z and around which is wound a coil 9 is also fixed to the plates 1 and 2. Airgaps 7 and 8 are formed between the edges of the ferromagnetic plates 1 and 2 and the polepiece 6 of the mobile body B. The polepiece 6 advantageously has teeth on crenellated projections 10 and 11 the same thickness and the same distance apart as the plates 1 and 2, facing the edges of the latter.

Figure 5:
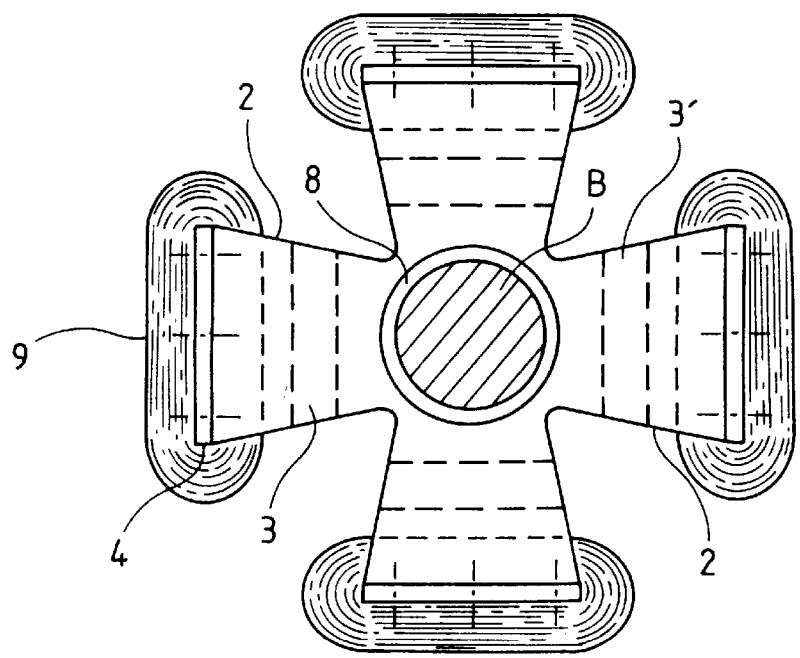
FIG. 5 is a plan view of another embodiment of a bearing in accordance with the present invention for radial centering of a body mobile in rotation, formed of two bearings of the kind shown in FIG. 1.

In a preferred embodiment of great practical importance, shown diagrammatically in FIG. 5 in a general arrangement that is conventional in itself, a basic bearing of the type shown in FIG. 1 is provided on each of two mutually perpendicular centering axes both perpendicular to the reference axis Z-Z. The two bearings each with one centering axis together constitute a more complex bearing with two centering axes. In this bearing the magnets 3 and 3' from FIG. 1 are part of a single annular magnet 3–3' magnetized in the axial direction disposed between two ferromagnetic disks 1–1' and 2–2' with an opening at their center. On the other hand, the cores 4 and 4' are part of an annular series of separate cores, there being one pair of diametrically opposite cores, 4, 4' and one pair of coils 9 and 9' for each centering axis.

The coils 9–9' are connected in series or in parallel in any way known in itself and are supplied with an electrical current determined in the conventional way from the offset of the mobile body B from its unstable equilibrium position, or preferably from its speed of displacement parallel to the axis X-X. This current is used to generate a magnetic field which is added to or subtracted from that generated by the magnet 3, depending on the location concerned.

Thus the current flowing through the coils, determined by a control circuit 12 from the output of a position, speed or acceleration sensor 13 facing the part 6, servocontrols the radial position of the part 6 relative to all of the fixed parts of the bearing, so making the system stable.

The benefit of this magnetic bearing with two active axes is that is enables magnetic suspension of a shaft or a cylinder for which translation movement and tilting relative to the geometrical axis must be controlled. The teeth 10 and 11, which are constituted by parallel annular projections, for example, provide a passive magnetic centering effect along the axis Z-Z. To increase the stiffness of this centering the teeth 10 and 11 and the edges of the ferromagnetic plates have a section with multiple crenellations, for example.

The system allows, through a magnetic wall, the guiding of a cylinder when the latter is adapted to move in translation along the axis Z-Z, i.e. when it incorporates no teeth 10 or 11.

Figure 2:
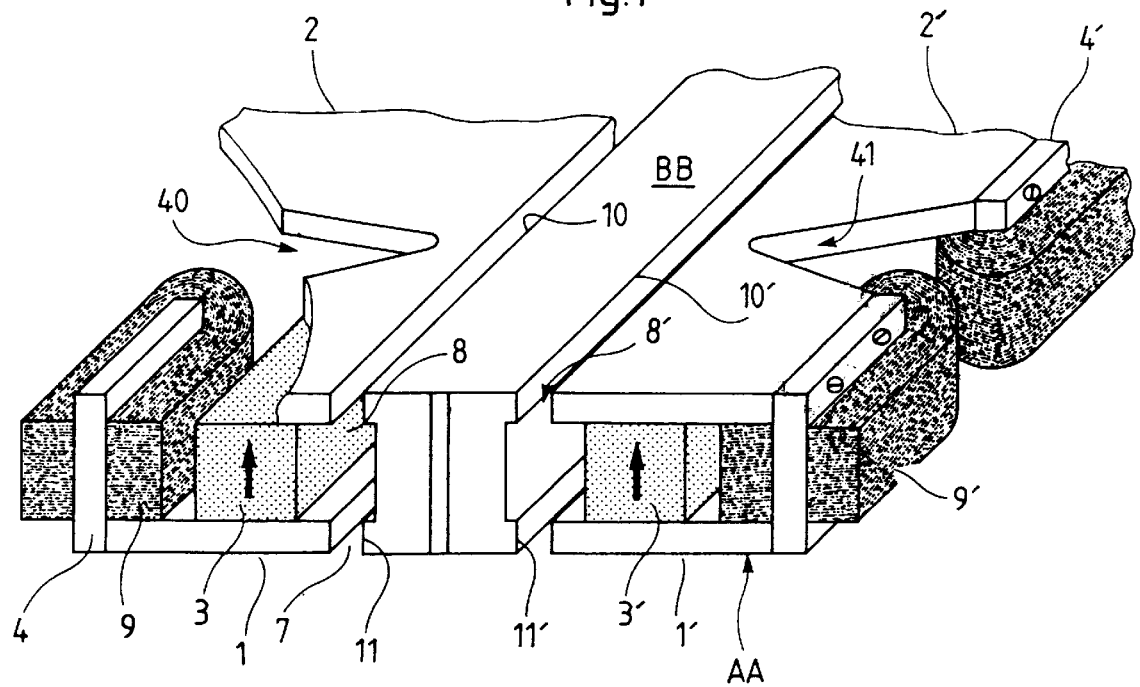
FIG. 2 is a partially cut away partial perspective view of a bearing for transverse centering of a body mobile in translation.

If teeth 10 and 11 of the polepiece 6 in FIG. 2 are eliminated, the resulting device has a "free" axis (no axial centering) perpendicular to the plane of suspension. This axis can then be stabilized by any form of auxiliary means whose radial stiffnesses do not disturb the stability of the device in the plane of suspension: a contactless linear motor is one example of this.

The number of control axes in the plane of suspension and the number of coils per axis (which can be equal to 1) can be increased at will.

FIG. 2 shows another bearing in accordance with the present invention adapted to center a bar adapted to move in translation along an axis perpendicular to the centering axis X-X and to the reference axis Z-Z. This bearing is formed of a row of at least two individual bearings as shown in FIG. 1 disposed side by side and adapted to operate on successive lengthwise areas of the bar. Accordingly, on either side of the central bar BB, the bearing is formed of two elongated magnets 3 and 3' between two elongated plates 1 and 2 or 1' and 2' fastened to a body A—A. Rows of cores 4 or 4' carrying coils 9 or 9' are disposed parallel to these magnets.

FIG. 2 shows that slots 40 or 41 are formed in the ferromagnetic plates 1 and 2 and 1' and 2' except near the central bar BB, to achieve magnetic separation from fields generated by adjacent coils.

In the FIG. 2 embodiment, because of the projections 10, 11, 10', 11' on the central bar BB near its longitudinal edges, active magnetic centering is achieved on an axis parallel to the ferromagnetic plates and passive magnetic centering is achieved parallel to the reference axis.

The operation of the bearings shown and described in FIGS. 1 and 2 conform to the operation described in document European Patent 0 284 487 (hereby incorporated herein by way of reference).

Figure 3:
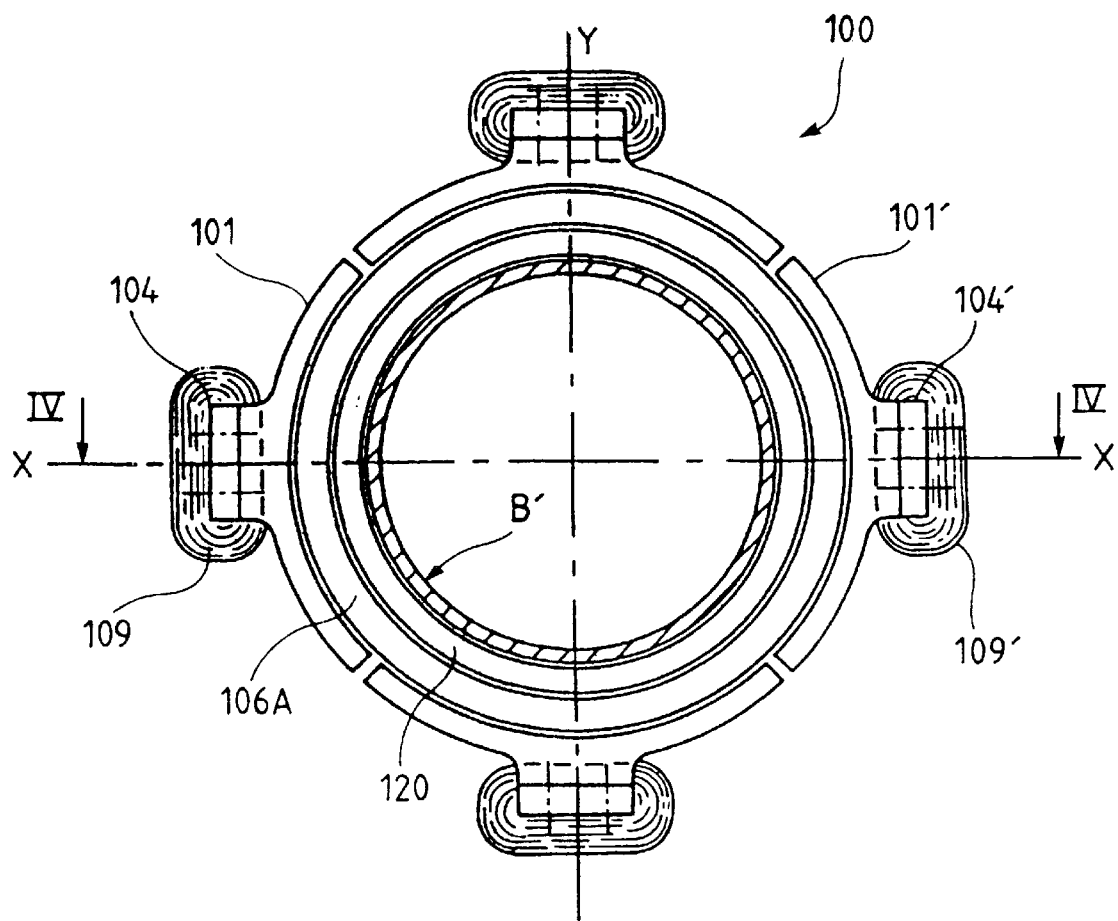
FIG. 3 is a plan view of another bearing in accordance with the present invention for radial centering of a body mobile in rotation.
Figure 4:
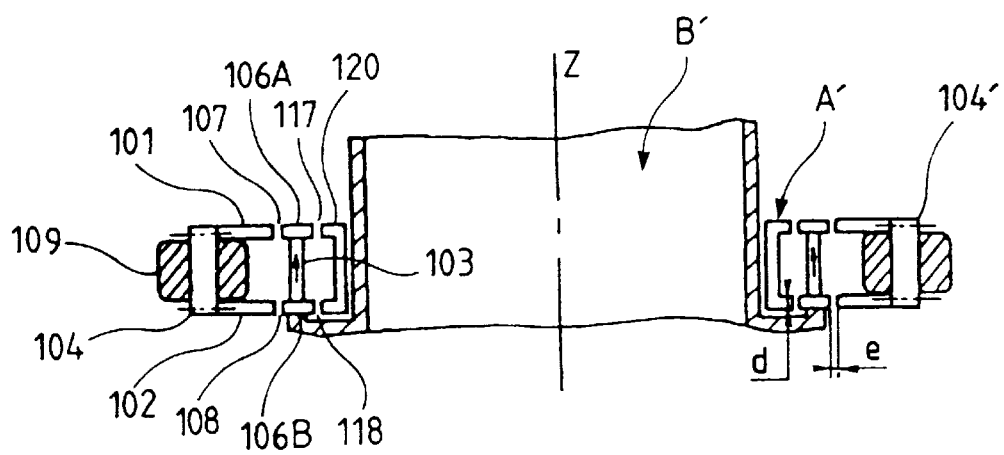
FIG. 4 is a view of the bearing from FIG. 3 in axial section on the line IV—IV.

FIGS. 3 and 4 show another bearing 100 in accordance with the present invention providing active radial centering of the body B', which is a rotor in this example, relative to a body A', which is a stator in this example, and formed of two bearings as shown in FIG. 4 disposed on mutually perpendicular axes X-X and Y-Y both perpendicular to the reference axis Z-Z.

As previously, the FIG. 4 bearing includes on each side of the axis Z-Z two ferromagnetic plates 101 and 102 parallel to the centering axis to which is fixed a ferromagnetic core 104 around which is wound a coil 109. Airgaps 107 and 108 are formed between the edges of the plates 101 and 102 and polepieces 106A and 106B fastened to the body B', which is mobile relative to the body A'.

Differing in this regard from those shown in FIGS. 1 and 2, the bearings of FIGS. 3 and 4 include a magnet 103 which is not disposed between the plates 101 and 102 to which the core is fixed, but instead between the polepieces 106A and 106B; furthermore, in the example shown, an additional C-shape ferromagnetic part 120 is fixed to the body A', on the opposite side of the magnet 103 to the parts 101 and 102; its edges, the same thickness d as the parts 101, 102, 106A and 106B, define with the parts 106A and 106B airgaps 117 and 118 which are for example the same width e as the airgaps 107 and 108.

The two-axis bearing or the two single-axis bearings of FIGS. 3 and 4 as described so far conform to the operational teaching of U.S. Pat. No. 4,470,644 (hereby incorporated by way of reference).

In accordance with the invention, the cores 4, 4', 104 and 104' on which the coils 9, 9', 109 or 109' are wound and attached to the edges of the plates 1, 2, 1', 2', 101 or 102.

The advantages of this arrangement is to enable the cores to be mounted at any stage in the assembly of the bearing or even of mounting the bearing in a structure receiving it.

Another advantage is enabling the cores to be mounted removably (thus using removable mounting arrangement that is advantageously accessible from the exterior of the bearing, rather than permanent fixing such as gluing or welding). This confers great adaptability: replacement of a damaged coil, replacement of a coil by a different coil having different performance characteristics better suited to current requirements, etc.

Thus by winding different coils (different width and/or diameter and/or wire material) onto identical cores it is possible to obtain a wide range of interchangeable core/coil pairs enabling an accurate choice of the final stiffness of the bearing.

It is particularly advantageous if the core is separated by an airgap 30 of constant thickness from at least one (preferably both) of the edges of the ferromagnetic plates 1 and 2 (or 1' and 2', 101 and 102, etc.) to provide the static shim recommended by the aforementioned European Patent 0 284 487.

Note that it is much easier to provide an airgap 30 of this kind (at any stage in fabrication) than it would be if the core were disposed between the ferromagnetic plates.

Figure 6:
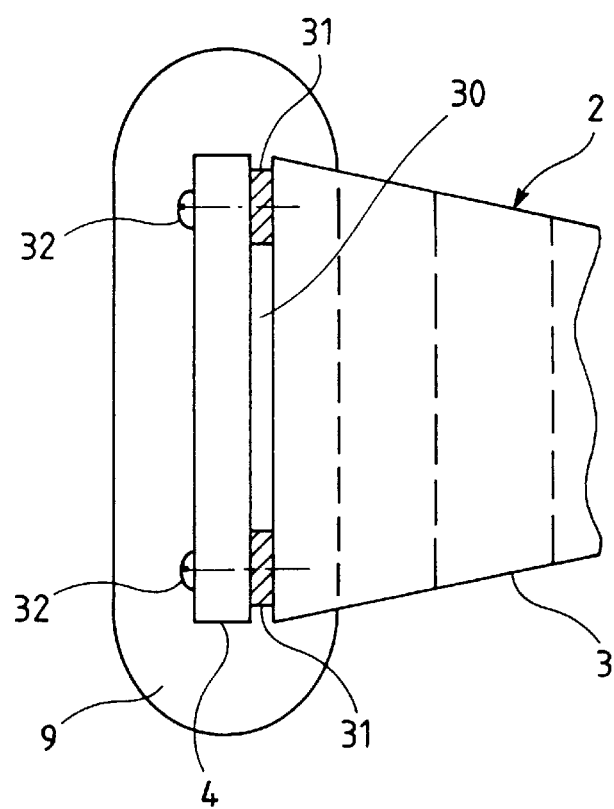
FIG. 6 is a view to a larger scale of the left-hand part of the bearing from FIG. 5.

As shown in FIG. 6, which shows part of FIG. 5 to a larger scale, the airgap 30 can simply be a layer of air (or of vacuum, depending on the environment in which the bearing is used), with a thickness determined by that of simple spacers 31, for example.

If the cores are removably fixed by using screwthreaded rods 32 (e.g. screws or bolts), these spacers are preferably simple washers mounted to the rods.

Adjustment of the airgap(s) 30 is a very simple matter, provided that a range of washers of diverse thicknesses is available (if necessary, the clamping force can be varied to compress these washers to a greater or lesser degree). A field sensor may be disposed in the airgap to measure its thickness.

These airgaps can of course be eliminated if necessary (as in the case of the disclosure of U.S. Pat. No. 4,470,644 in particular).

For storage, fabrication and assembly the cores are advantageously flat (in particular this enables easy storing, and also the possibility of mounting a core either in a bearing for a rotating body or in a bearing for a body moving in translation).

It goes without saying that the foregoing description has been given by way of non-limiting example only and that numerous variants may be proposed by the person skilled in the art without departing from the scope of the invention. For example there may only be one coil per centering axis.

There is claimed:

1. A magnetic bearing for active magnetic centering on at least one centering axis perpendicular to a reference axis of a first body mobile on at least said centering axis relative to a second body, said magnetic bearing comprising:

at least one permanently magnetized member extending substantially parallel to said reference axis;

a ferromagnetic core having a coil wound around said ferromagnetic core and extending substantially parallel to said reference axis, said coil being carried by said second body; and a ferromagnetic armature formed of a ferromagnetic first part carried by said first body and a ferromagnetic second part carried by said second body, said ferromagnetic first part and said ferromagnetic second part conjointly closing upon themselves the fluxes generated by said permanently magnetized member and said coil by at least one airgap spaced on opposing sides of said centering axis between said ferromagnetic first part and said ferromagnetic second part, said ferromagnetic second part having two parallel plates extending perpendicular to said reference axis, each of said two parallel plates being attached to said ferromagnetic core on a respective side of said coil and each said two parallel plates having a transversely oriented edge facing said at least one airgap on one end thereof, and oppositely disposed end faces, said ferromagnetic core being attached to said end faces of said parallel plates.

2. A magnetic bearing according to claim 1 further comprising means for removably attaching said core to said end faces of said parallel plates.

3. A magnetic bearing according to claim 1 wherein said permanently magnetized member is carried by said second body between said parallel plates, said core being separated from at least one of said edges of said parallel plates by an airgap of constant thickness.

4. A magnetic bearing according to claim 3 wherein the airgap of constant thickness is a layer of air or vacuum.

5. A magnetic bearing according to claim 1 and further comprising:

a plurality of screwthreaded rods attaching said ferromagnetic core to said end faces of said parallel plates; and at least one washer fitted around each rod of said plurality of screwthreaded rods attaching said ferromagnetic core to said end faces of said parallel plates, said at least one washer defining a second airgap between said end faces and said ferromagnetic core, the thickness of said second airgap being defined by the thickness of said at least one washer.

6. A magnetic bearing according to claim 1 wherein said permanently magnetized member is carried by said first body.

7. A magnetic bearing according to claim 6 and further comprising:

a plurality of screwthreaded rods attaching said core to said end faces of said parallel plates.

8. A magnetic bearing according to claim 1 wherein said reference axis is an axis about which said first body turns relative to said second body, said bearing further comprising a plurality of permanently magnetized members, cores and armatures and means for interconnecting said magnetized members, cores and armatures with each other.

9. A magnetic bearing according to claim 8 wherein said cores are in the form of flat plates.

* * * * *